July 24, 1928.
E. J. SERPAS
1,677,992
REGULATING APPARATUS
Filed Sept. 19, 1927    2 Sheets-Sheet 1
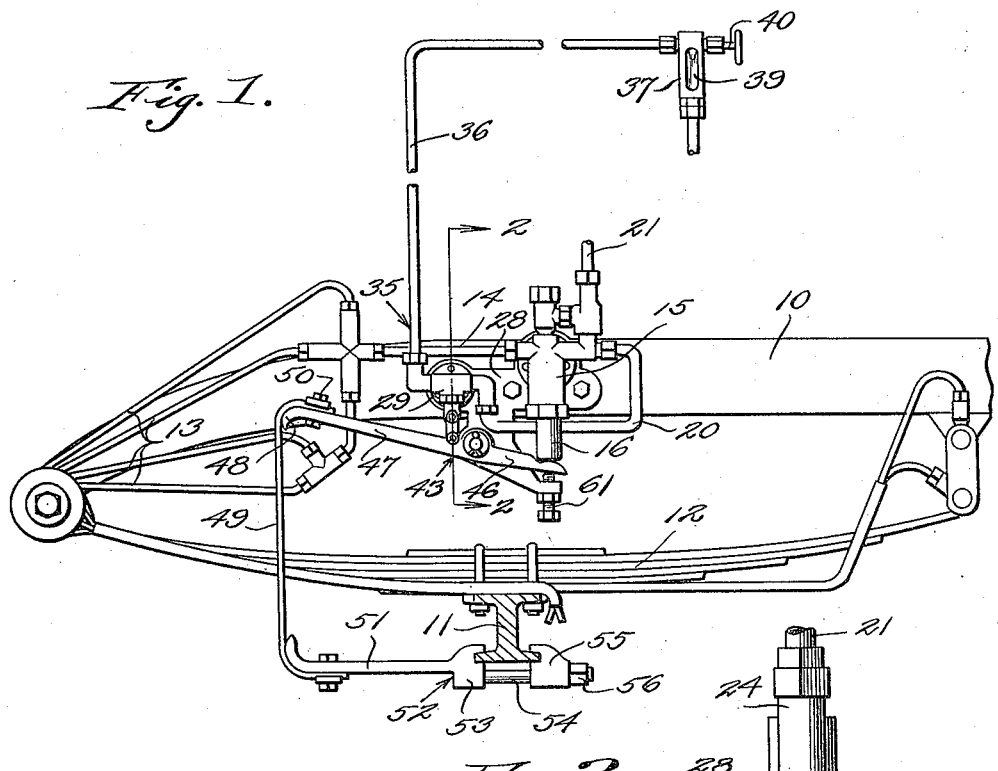
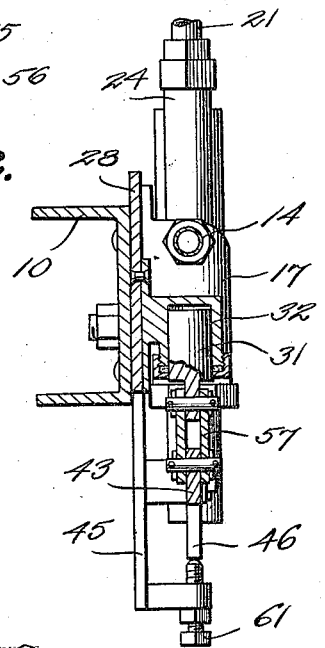
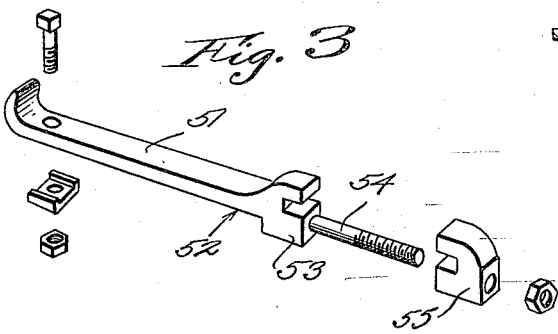

July 24, 1928.

E. J. SERPAS 1,677,992

REGULATING APPARATUS

Filed Sept. 19, 1927

E. J. Serpas

INVENTOR

BY Victor J. Evans

ATTORNEY

WITNESS:

Patented July 24, 1928.

1,677,992

UNITED STATES PATENT OFFICE.

ERNEST J. SERPAS, OF NEW ORLEANS, LOUISIANA.

REGULATING APPARATUS.

Application filed September 19, 1927. Serial No. 220,599.

The present invention relates to regulating devices and is particularly adapted for regulating the flow of lubricants in a lubricating system, as in that of an automobile.

An object of the invention is to provide a regulating device by which the amount of lubricant fed through the system may be determined and regulated at will.

Another object is to provide such means that may be installed at any convenient place on the instrument board of a vehicle where it may be visible to the driver and by which the flow of lubricant through the system may be regulated, stopped or started under the control of the operator of the vehicle.

Further objects are to provide a supplemental system to the lubricating system of the vehicle in which the flow of lubricant may be indicated and regulated at will and to provide means by which the lubricant is pumped through the supplemental system and by which the pumping through the lubricating system proper may be stopped automatically when the flow through the supplemental system is obstructed.

Other objects and advantages will appear from the following description and will be set forth in the appended claims, and I do not wish to be limited in the scope of my invention except as I shall be limited by said claims.

In the drawings:

Figure 1 shows my invention in connection with the lubricating system of a motor vehicle.

Figure 2 is a section on the line 2—2 of Figure 1, looking in the direction of the arrows and showing on an enlarged scale compared with Figure 1 the pumping apparatus and in section the supplemental pump.

Figure 3 is a detail view of the arm and the clamping attachments therefor, the parts thereof being disassembled.

Figure 4:
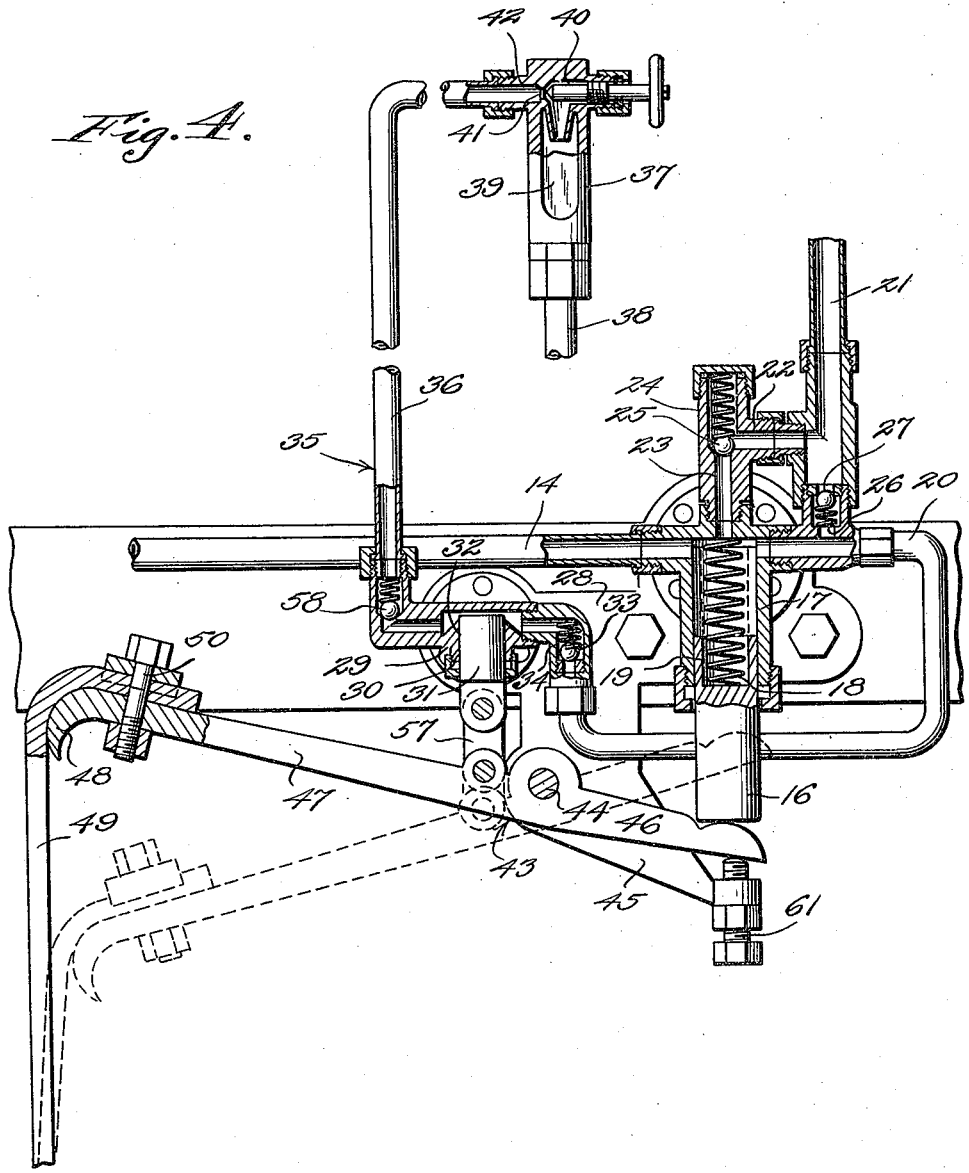
Figure 4 is a view partly in section, showing the arrangement of the parts in the interior of the pump for the lubricating system and the arrangement within the supplemental pump and in the gauge arranged in the supplemental system.

Referring to the drawings in detail, by reference numerals, 10 designates a portion of the chassis of an automobile; 11 is one of the axles of the vehicle; 12 is a spring securing the axle to the frame of the chassis; 13 are branch pipes leading from a main pipe 14 of the lubricating system; 15 is a lubricating pump having a piston 16 slidably mounted in the cylinder 17 thereof and being held normally in its lower position by means of a compression spring 18 located within the cylinder and having one end thereof received in a socket 19 formed in the upper end of the piston 16, the upper end of the spring resting against the upper end of the cylinder. The pipe 14 communicates with the cylinder at the upper end, as does also the pipe 20. The pipe 21 communicates with the cylinder 17 through passageways 22 and 23 leading to and from a valve casing 24 having a spring-pressed check valve 25 located therein. The pipe 21 also communicates with the pipe 20 through the passageway 26 controlled by the check valve 27. The cylinder 17 is secured to the frame of the chassis by means of a plate 28 formed thereon, and said plate is also provided with a supplemental pump or ram secured thereto at 29 and comprising a cylinder 30 having a piston 31 slidably mounted therein, the chamber 32 of said supplemental pump being in communication through the pipe 20 with the cylinder 17 of the lubricating pump 15, the communication being controlled by a check valve 33 arranged in an L-shaped fitting 34 connecting the pipe 20 to the supplemental pump. The supplmeental pump is arranged in the supplemental system 35 comprising a pipe 36, a gauge 37 in communication with said pipe, and a pipe 38 leading back to the oil tank, the gauge 37 being provided with a window 39 through which the movement of lubricant through the gauge casing may be observed. The flow of lubricant through the gauge is controlled by a needle valve 40 controlling an aperture 41 between the passageway 42 communicating with the pipe 36 and the interior of the chamber in the gauge 37, the said pipe forming communication between said gauge and said supplemental pump through check valve 58.

The pipe 21 is in connection with the oil tank, not shown, as being no part of the present invention. The piston 16 of the lubricating pump 15 is actuated by means of a lever 43 pivoted at 44 to a bracket 45 extending from the chassis, one arm 46 of said lever contacting with the lower end of the piston 16, and the other arm 47 having its end curved at 48 and provided with a flexible strap 49 secured thereto, as by a bolt 50, and extending over the curved portion and downwardly to connect with an arm 51 secured by suitable clamping means 52 to the axle of the vehicle, the clamping means comprising an enlargement 53 on the rear end of the arm 51, having a kerf therein adapted to receive the angle extension of the axle and provided with a threaded stem 54 and a kerfed block 55 slidable on the stem 54 and adapted to receive another portion of the axle in said kerf. The parts are held in clamping relation by means of a nut 56 threaded to the end of the stem 54.

The operation is as follows:—

When the vehicle is in motion the lever 43 will be rocked on its axis 44, as indicated in dotted lines in Figure 4, thus raising the pump piston 16 and forcing lubricant through the lubricating system 14. When the lever 43 is allowed to return to the full line position shown in Figure 4, the coil spring 18 will return the pump piston 16 downwardly, thus drawing in lubricant through the check valve 27 from the pipe 21 which communicates with the source of supply. As there will be a certain back pressure in the lubricating system 14, and as the return line or supplemental system 20 communicates with the pump cylinder 17, a quantity of the lubricant will be pumped by the plunger 16 into the return line 20. This action will be facilitated by the movement of the ram plunger 31, which is mechanically coupled to the pump operating lever 43 by a link 57. Consequently, the ram plunger 31 will descend when the pump plunger 16 moves upwardly on its compression stroke. The partial vacuum formed in the plunger chamber 32 will tend to draw in lubricant into the return line and past the check valve 33. Due to the mechanical coupling between the plungers 16 and 31, the latter will be moved upwardly on expanding movement of the spring 18 and will act to force the charge of lubricant received in the ram chamber 32 upwardly into the pipe 36 past the valve 58. So long as the valve 40 in the return line remains open, the action of the pump 16 and the lubricating system will not be interfered with but will go on in accordance with the relative movement between the chassis and body of the vehicle incident to road shocks and vibrations. However, when the valve 40 is closed, the outlet for the lubricant from the return line to the source of supply is shut off and a pressure will be gradually built up in the pipe 36 between the ram plunger 31 and the control valve 40.

This pressure will finally reach such a degree that the ram plunger 31 will be held against movement in a downwardly displaced position which will act to prevent further rocking movement of the operating arm 43 and consequently further movement of the pump plunger 16. In this event the operation of the lubricating system is suspended and may not be resumed until the control valve 40 in the return line is opened, as the ram plunger 31 cannot move until the accumulated pressure is relieved.

It will be apparent from the above description that, by means of the valve 40, the amount of lubricant flowing through this system and the rapidity of pumping may be regulated, or may be stopped altogether. Downward movement of the lever arm 43 is adjustably limited by a set screw 61 carried in the bracket 45. This set screw 61 thus limits the throw of the lever 43 and consequently the throw of the pump plunger 16. The valve 25 permits the relief of excess pressure in the system.

Having described my invention, what I claim is:

1. In combination with a lubricating system for vehicles having lubricant carrying conduits in connection with a pump, a piston in said pump and means having connection with the axle of the vehicle for operating said piston, a supplemental system, a ram in said supplemental system having a piston connected with said operating means, a pipe forming communication between the pump and the ram casing, a check valve interposed between said pipe and said ram casing, and means for controlling the flow of lubricant through the supplemental system.

2. In combination with a lubricating system for a vehicle having a pump therein for pumping lubricant through said system, a piston in said pump, a lever secured to the vehicle for operating said piston, said lever having one arm contacting with the piston and the other arm connected with an axle of the vehicle, a supplemental system for the passage of lubricant, a supplemental pump in said supplemental system, a piston in said supplemental pump connected with the arm of the lever opposite to that contacting with the piston of the lubricating pump, a pipe leading from the lubricating pump to the supplemental pump, a check valve interposed between said pipe and said supplemental pump, a gauge in the supplemental system, and a valve for controlling the flow of lubricant through said supplemental system.

3. In combination with a lubricating system for vehicles comprising a series of pipes in communication with a pump, said pump consisting of a cylinder having a piston slidable therein, a lever mounted on the vehicle and having one arm contacting with the lower end of said piston, an arm connected with an axle of the vehicle and having flexible connection with the opposite end of said lever, a supplemental system adapted for the flow of lubricant therethrough connected with the above named lubricating system through said pump, a supplemental pump in said supplemental system having a piston therein and having communication with said first named pump, said piston having flexible connection with said lever, a gauge in said supplemental system having an observation window therein, a valve for controlling the flow of lubricant into said gauge, a pipe forming communication from said gauge to said supplemental pump, and a check valve in said pipe.

4. In a force feed chassis lubricating system, means operated by relative movement of the chassis parts for drawing lubricant from a source of supply and circulating same to the parts to be lubricated, a return line from the lubricating system to the source of supply, a valve for opening and closing the return line, and means in the return line coupled to said first means for arresting the movement of the latter on the building up of a predetermined pressure in the return line.

5. In a force feed chassis lubricating system, means operated by relative movement of the chassis parts for drawing a supply of lubricant from a source of supply and circulating same to the parts to be lubricated, a return line from the lubricating system to the source of supply, a valve in the return line for opening and closing said line, and a plunger mechanically coupled to said means and adapted to be displaced and held against movement by predetermined pressure obtaining in said return line and for consequently arresting the movement of said means.

6. In a force feed chassis lubricating system, means operated by relative movement of the chassis parts for drawing lubricant from a source of supply and circulating same to the parts to be lubricated, a return line from said means to the source of supply, a movable plunger in said return line, and manually-adjusted valve means in said return line adapted to be closed to build up a pressure therein for arresting the movement of said plunger and consequently of said means and adapted to be opened to relieve said pressure whereby the operation of the plunger and means may be resumed.

In testimony whereof I affix my signature.

ERNEST J. SERPAS.